(12) United States Patent
Hui

(10) Patent No.: US 7,387,275 B1
(45) Date of Patent: Jun. 17, 2008

(54) FISHING LEADER DISPENSER

(76) Inventor: Jason Hui, 43 Oakview Ter., Apt. 2, Jamacia Plain, MA (US) 02130

( * ) Notice: Subject to any disclaimer, the term of this patent is extended or adjusted under 35 U.S.C. 154(b) by 400 days.

(21) Appl. No.: 11/269,507

(22) Filed: Nov. 8, 2005

Related U.S. Application Data

(60) Provisional application No. 60/626,509, filed on Nov. 8, 2004.

(51) Int. Cl.
    *B65D 85/02* (2006.01)
(52) U.S. Cl. .............. 242/588.3; 242/588.6; 242/137.1; 242/601; 242/405; 242/405.1; 242/400.1
(58) Field of Classification Search ........... 242/405, 242/405.1, 400.1, 402, 397, 588.3, 137.1, 242/601, 566, 129, 588.2, 405.2–405.3
    See application file for complete search history.

(56) References Cited

U.S. PATENT DOCUMENTS

| | | | |
|---|---|---|---|
| 1,890,945 A | | 12/1932 | Hormel |
| 2,712,908 A | * | 7/1955 | Kozminski ............... 242/396.7 |
| 3,006,574 A | | 10/1961 | Hardy |
| 3,062,475 A | * | 11/1962 | Miller, Jr. ................ 242/405.1 |
| 3,601,330 A | | 8/1971 | Minobe |
| 4,688,740 A | * | 8/1987 | Weeks et al. ............. 242/396.7 |
| 5,106,056 A | * | 4/1992 | Crates et al. ........ 254/134.3 FT |
| 5,280,861 A | * | 1/1994 | Corriveau ................... 242/586 |
| 5,551,646 A | | 9/1996 | Goldstein |
| 5,738,297 A | | 4/1998 | Bailey et al. |
| 5,971,316 A | * | 10/1999 | Kim .......................... 242/601 |
| 6,409,017 B1 | * | 6/2002 | Bookbinder et al. ........ 206/398 |
| 2007/0210131 A1 | * | 9/2007 | Yarborough et al. .......... 225/56 |

\* cited by examiner

*Primary Examiner*—Peter M. Cuomo
*Assistant Examiner*—Sang Kim
(74) *Attorney, Agent, or Firm*—Richard C. Conover

(57) ABSTRACT

A fishing leader dispenser having in combination a leader spool having leader wrapped thereon and a protective cover which resiliently fits over the leader on the leader spool. This leader spool includes a tubular hub having an enlarged central opening, a pair of spaced apart outwardly extending flanges molded to the circular hub and a finger depression formed on the inner surface of the tubular hub. The protective cover includes a resilient strip formed into a broken annulus presenting two free ends. The protective cover is sized to resiliently fit between the pair of flanges and around the hub covering the leader. The protective cover further has a notch provided along an edge of the resilient strip through which the leader is extended. Finally, the protective cover is provided with an outwardly extending protrusion for manipulating the protective cover positioned over the leader wound on the hub.

2 Claims, 3 Drawing Sheets

FISHING LEADER DISPENSER

This application claims the benefit of provisional application Ser. No. 60/626,509 filed Nov. 8, 2004.

BACKGROUND OF THE INVENTION

The present invention relates to a fishing leader dispenser which has an enlarged central opening to allow a user to insert a couple of fingers through the opening, to allow the spool to spin around the fingers when drawing leader from the spool.

Fishing leader dispensers are known such as shown in U.S. Pat. No. 5,738,297 To Bailey et al. The known leader spools used with leader dispensers generally have a small central hole which does not allow for a user to insert fingers through the central opening.

Further, a common problem with leader spools is that it is difficult to maintain the leader on the spool so that the leader does not unwind unintentionally from the spool when not in use.

The present invention overcomes the known problems relating to leader spool dispensers.

SUMMARY OF INVENTION

The present invention is directed to a fishing leader dispenser having in combination a leader spool having leader wrapped thereon and a protective cover which resiliently fits over the leader on the leader spool. This leader spool includes a tubular hub having an enlarged central opening, a pair of spaced apart outwardly extending flanges molded to the circular hub and a finger depression formed on the inner surface of the tubular hub. The protective cover includes a resilient strip formed into a broken annulus presenting two free ends. The protective cover is sized to resiliently fit between the pair of flanges and around the hub covering the leader. The protective cover further has a notch provided along an edge of the resilient strip through which the leader is extended. Finally, the protective cover is provided with an outwardly extending protrusion for manipulating the protective cover positioned over the leader wound on the hub.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
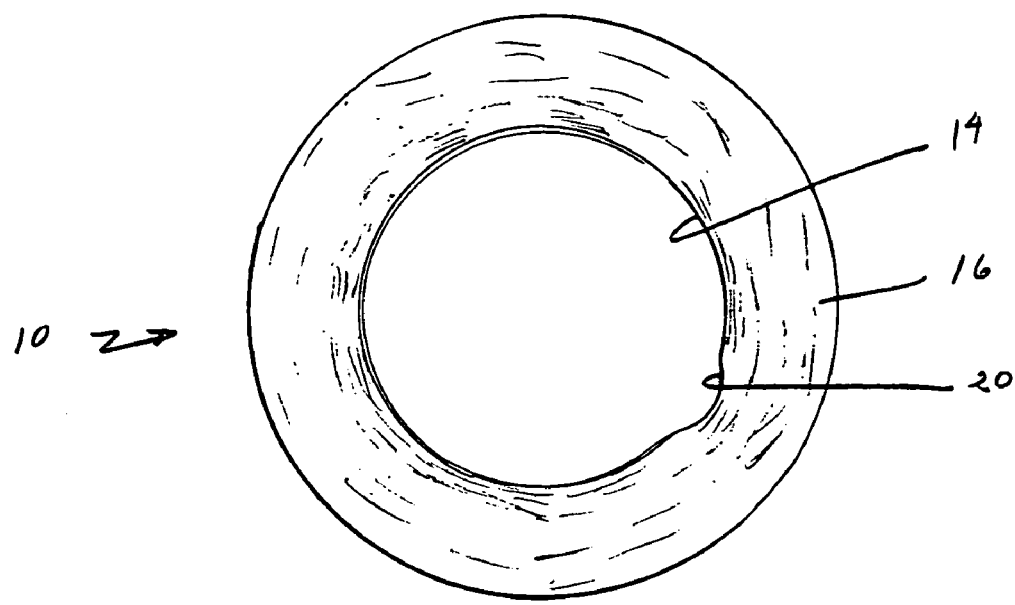
FIG. 1 is a front elevational view of a leader spool according to the present invention.
Figure 2:
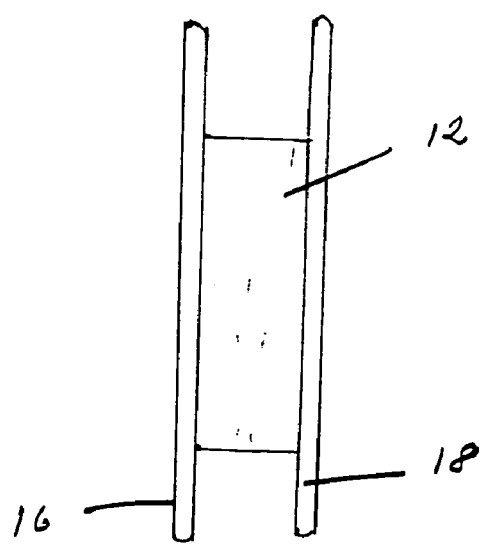
FIG. 2 is a side elevational view of the leader spool shown in FIG. 1 with a protective cover removed.
Figure 3:
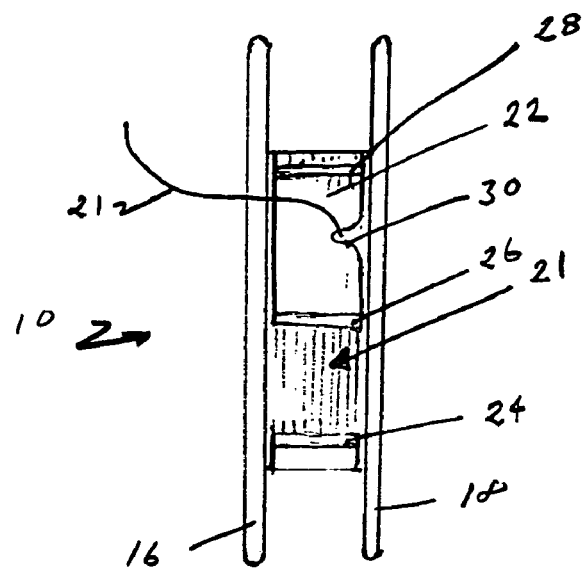
FIG. 3 is a side elevational view of the leader spool shown in FIG. 1 with a protective cover in place.

A fishing leader dispenser 10 according to the present invention is shown in FIGS. 1 and 3. The leader dispenser 10 includes a tubular hub 12 having an enlarged central opening 14. A pair of outwardly extending flanges 16 and 18 are molded to the hub 12 as shown in FIGS. 2 and 3. The inner surface of hub 12 is also provided with a finger depression 20 as shown in FIG. 1. Fishing leader 21 is wound on the hub 12 in a conventional manner.

Figure 4:
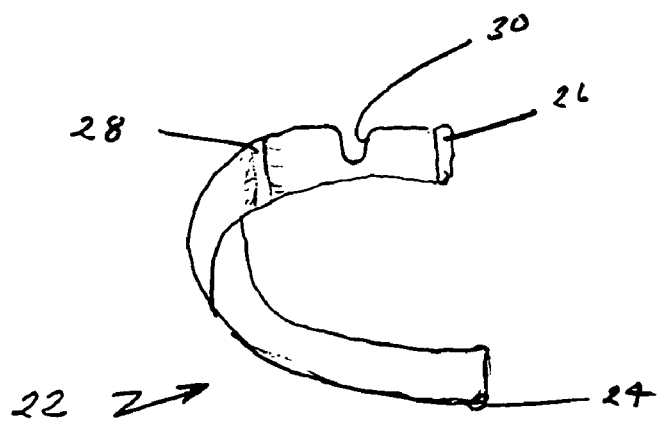
FIG. 4 is a perspective view of a protective cover used with the present invention.
Figure 5:
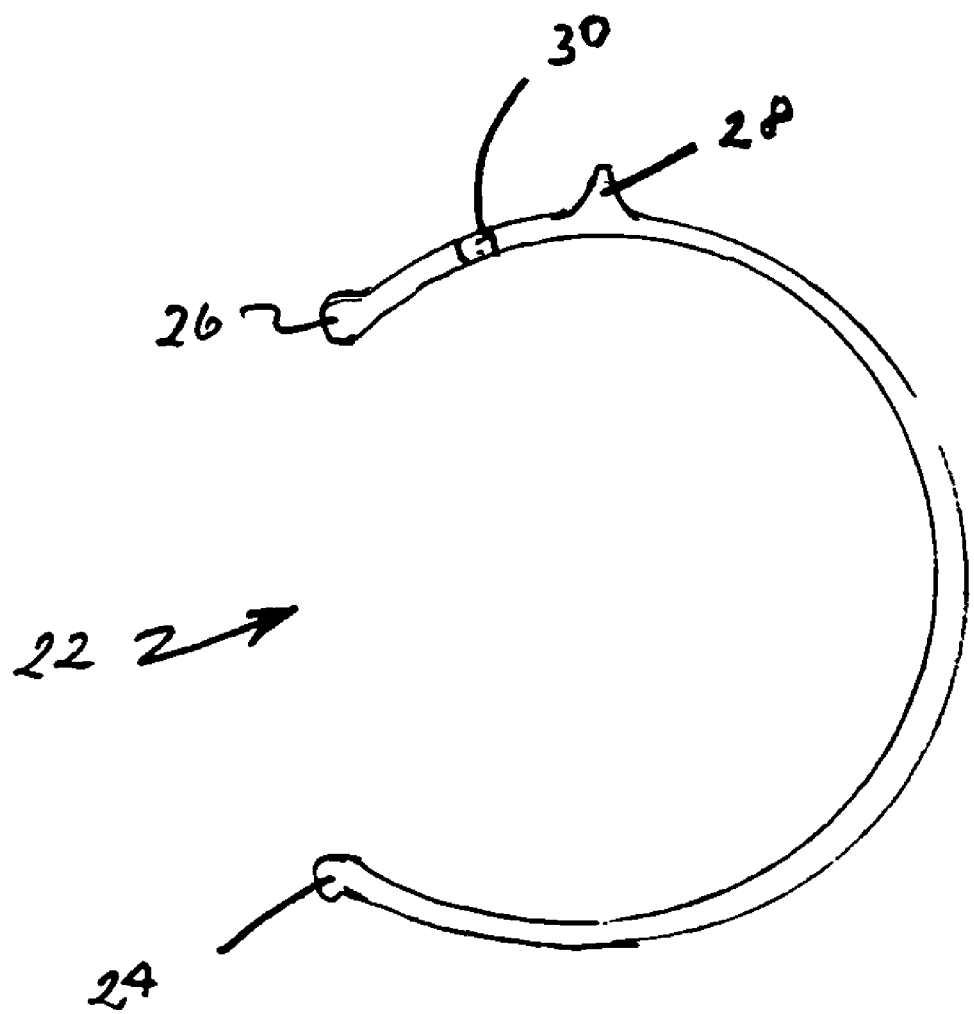
FIG. 5 is an elevational view of the protective cover shown in FIG. 4.

A leader protective cover 22 is shown in FIGS. 3-5. The protective cover 22 is constructed of a plastic strip material formed in an approximate ¾ circle shape and is positioned on the hub 12 over the leader wound on the hub 12. The cover 22 is constructed of a resilient material which resiliently retains its circular shape. The protective cover 22 holds the leader in place so that it does not unwind unintentionally from the spool.

The protective cover 22 includes rounded end portions 24 and 26 and also an outwardly extending finger protrusion 28 for manipulating the protective cover 22 positioned over the leader wound on the hub 12. The protective cover 22 is also provided with an opening 30 which is notched on an outside edge of the protective cover 22 as shown in FIG. 4.

A free end of the leader wound on hub 12 is positioned to extend through the opening 30 as shown in FIG. 3. By pulling the free end of the leader it can be dispensed in a controlled manner.

In using the present invention, the leader is wound on the hub 12 and the protective cover 22 snapped on the hub 12 to cover the leader. The free end of the leader is drawn through the opening 30 to allow for dispensing of the leader on the hub 12. The central opening 14 is sized to allow a user to insert a couple of fingers within the central opening 36 when dispensing the leader. When the leader is pulled through opening 30, the spool 10 will spin around the fingers inserted in opening 14. The depression 20 allows the user to count the number of revolutions of the spool 10 by giving the user an indication of one revolution when the finger of the user feels the depression 20 going by. After sufficient leader is dispensed and cut away, the user may retract the excess leader back onto the hub 12 by manipulating the finger protrusion 28 to rotate the cover 22 in the same direction as the leader wound on the hub 12.

While the fundamental novel features of the invention have been shown and described, it should be understood that various substitutions, modifications, and variations may be made by those skilled in the arts, without departing from the spirit or scope of the invention. Accordingly, all such modifications or variations are included in the scope of the invention as defined by the following claims:

I claim:

1. A fishing leader dispenser comprising in combination:
a leader spool having leader wrapped thereon;
the leader spool comprising:
   a tubular hub having an enlarged central opening;
   a pair of spaced apart outwardly extending flanges molded to the tubular hub;
   a finger depression formed on the inner surface of the tubular hub; and
   a protective cover comprising:
   a resilient strip formed into a broken annulus presenting two free ends;
   the protective cover sized to resiliently fit between the pair of flanges, around the hub and covering the leader;
   the protective cover having a notch provided along an edge of the resilient strip through which the leader is extended;
   the protective cover provided with an outwardly extending protrusion for manipulating the protective cover positioned over the leader wound on the hub.

2. The fishing leader dispenser according to claim 1 wherein the two free ends of the resilient strip are rounded.

* * * * *